US012739930B2

(12) United States Patent
Yatagai et al.

(10) Patent No.: US 12,739,930 B2
(45) Date of Patent: Sep. 15, 2026

(54) NON-TRANSITORY COMPUTER-READABLE RECORDING MEDIUM STORING COMPUTER READABLE INSTRUCTIONS FOR TERMINAL DEVICE TO CAUSE COMMUNICATION DEVICE TO ESTABLISH WIRELESS CONNECTION WITH ACCESS POINT, TERMINAL DEVICE, AND METHOD FOR CONTROLLING TERMINAL DEVICE

(71) Applicant: BROTHER KOGYO KABUSHIKI KAISHA, Nagoya (JP)

(72) Inventors: Masayuki Yatagai, Nagoya (JP); Takeshi Shiotani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 487 days.

(21) Appl. No.: 18/365,576

(22) Filed: Aug. 4, 2023

(65) Prior Publication Data

US 2024/0049334 A1 Feb. 8, 2024

(30) Foreign Application Priority Data

Aug. 5, 2022 (JP) ................................ 2022-125600

(51) Int. Cl.

| | |
|---|---|
| ***H04W 76/25*** | (2018.01) |
| ***H04W 76/10*** | (2018.01) |
| ***H04W 76/15*** | (2018.01) |
| ***H04W 76/34*** | (2018.01) |
| ***H04W 84/12*** | (2009.01) |

(52) U.S. Cl.

CPC .......... *H04W 76/25* (2018.02); *H04W 76/15* (2018.02); *H04W 76/34* (2018.02); *H04W 84/12* (2013.01)

(58) Field of Classification Search

None

See application file for complete search history.

(56) References Cited

U.S. PATENT DOCUMENTS

| | | | | |
|---|---|---|---|---|
| 9,986,591 | B2 * | 5/2018 | Yada | H04W 76/36 |
| 10,212,739 | B2 * | 2/2019 | Ianev | H04W 4/70 |
| 2006/0242304 | A1 * | 10/2006 | Hirose | H04L 67/02 709/227 |

(Continued)

FOREIGN PATENT DOCUMENTS

| | | |
|---|---|---|
| JP | 2004056449 A | 2/2004 |
| JP | 2015056681 A | 3/2015 |

(Continued)

*Primary Examiner* — Jenee Holland

(74) *Attorney, Agent, or Firm* — Scully, Scott, Murphy & Presser, P. C.

(57) ABSTRACT

A terminal device may: send a connection instruction including connection information to a communication device through a first wireless connection not via an access point, the connection instruction being for causing the communication device to execute a connection process, the connection process being a process for establishing a second wireless connection between the communication device and the access point based on the connection information; and send a completion instruction to the communication device via the access point through a third wireless connection between the terminal device and the access point, the completion instruction being for causing the communication device to complete the connection process.

17 Claims, 7 Drawing Sheets

(56) References Cited

U.S. PATENT DOCUMENTS

2011/0103255 A1* 5/2011 Ikeda ..................... H04L 45/00 370/252
2012/0014299 A1* 1/2012 Yoon ..................... H04W 76/10 370/310
2013/0196702 A1* 8/2013 Shibata .............. H04N 1/00307 455/509
2015/0193183 A1* 7/2015 Ichikawa .............. G06F 3/1236 358/1.15
2016/0192429 A1* 6/2016 Nogawa ................ H04L 67/303 370/329
2017/0094451 A1* 3/2017 Terashita ................ H04W 4/06
2017/0127384 A1* 5/2017 Shimada ............... H04W 76/12
2018/0184346 A1* 6/2018 Wang .................... H04W 36/08
2018/0248697 A1* 8/2018 Shimada ............... G06F 3/1204
2019/0104464 A1 4/2019 Ruan
2019/0394703 A1 12/2019 Ruan
2020/0045763 A1* 2/2020 Watanabe ............. G06F 3/1236
2020/0084313 A1* 3/2020 Koizumi ............ H04N 1/00411
2020/0104081 A1* 4/2020 Miyake .............. G06K 7/10722
2020/0169948 A1* 5/2020 Sekiguchi ............. H04W 48/16
2020/0344588 A1* 10/2020 Nakahara .............. H04W 84/12
2020/0344668 A1 10/2020 Ruan
2020/0396582 A1* 12/2020 Suzuki .................. H04W 8/005
2021/0100045 A1 4/2021 Tsuji et al.
2021/0378055 A1* 12/2021 Miyake ................. H04L 63/083
2022/0386223 A1* 12/2022 Hitotsuya ............. H04W 76/14
2023/0354449 A1* 11/2023 Konji .................... H04W 76/10
2024/0267717 A1* 8/2024 Suzaki .................. H04W 8/005

FOREIGN PATENT DOCUMENTS

JP 2019068202 A 4/2019
JP 2021057756 A 4/2021

* cited by examiner

FIG. 1

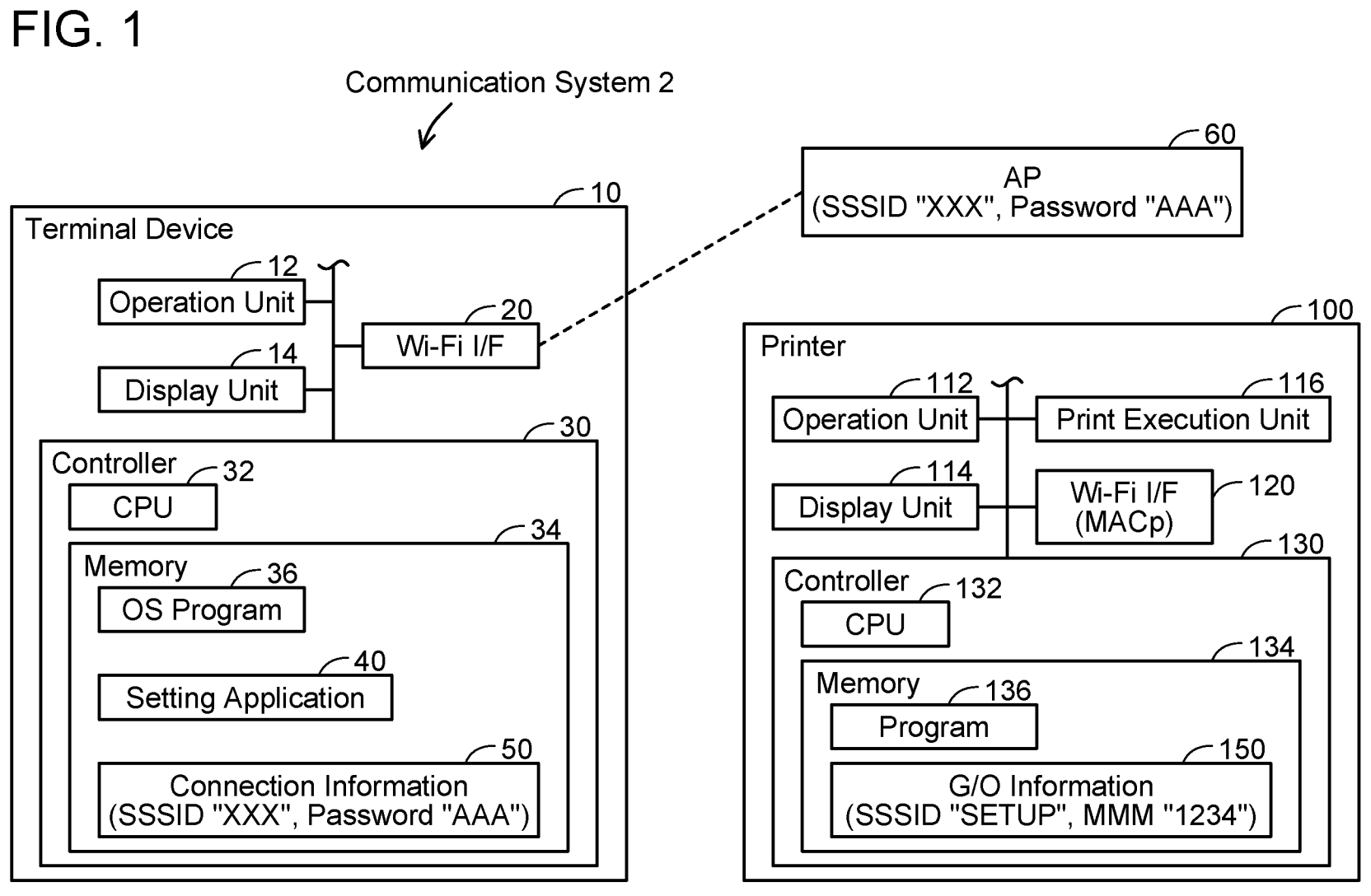

Communication System 2

Terminal Device 10
Operation Unit 12
Display Unit 14
Wi-Fi I/F 20
Controller 30
CPU 32
Memory 34
OS Program 36
Setting Application 40
Connection Information (SSSID "XXX", Password "AAA") 50

AP (SSSID "XXX", Password "AAA") 60

Printer 100
Operation Unit 112
Display Unit 114
Print Execution Unit 116
Wi-Fi I/F (MACp) 120
Controller 130
CPU 132
Memory 134
Program 136
G/O Information (SSSID "SETUP", MMM "1234") 150

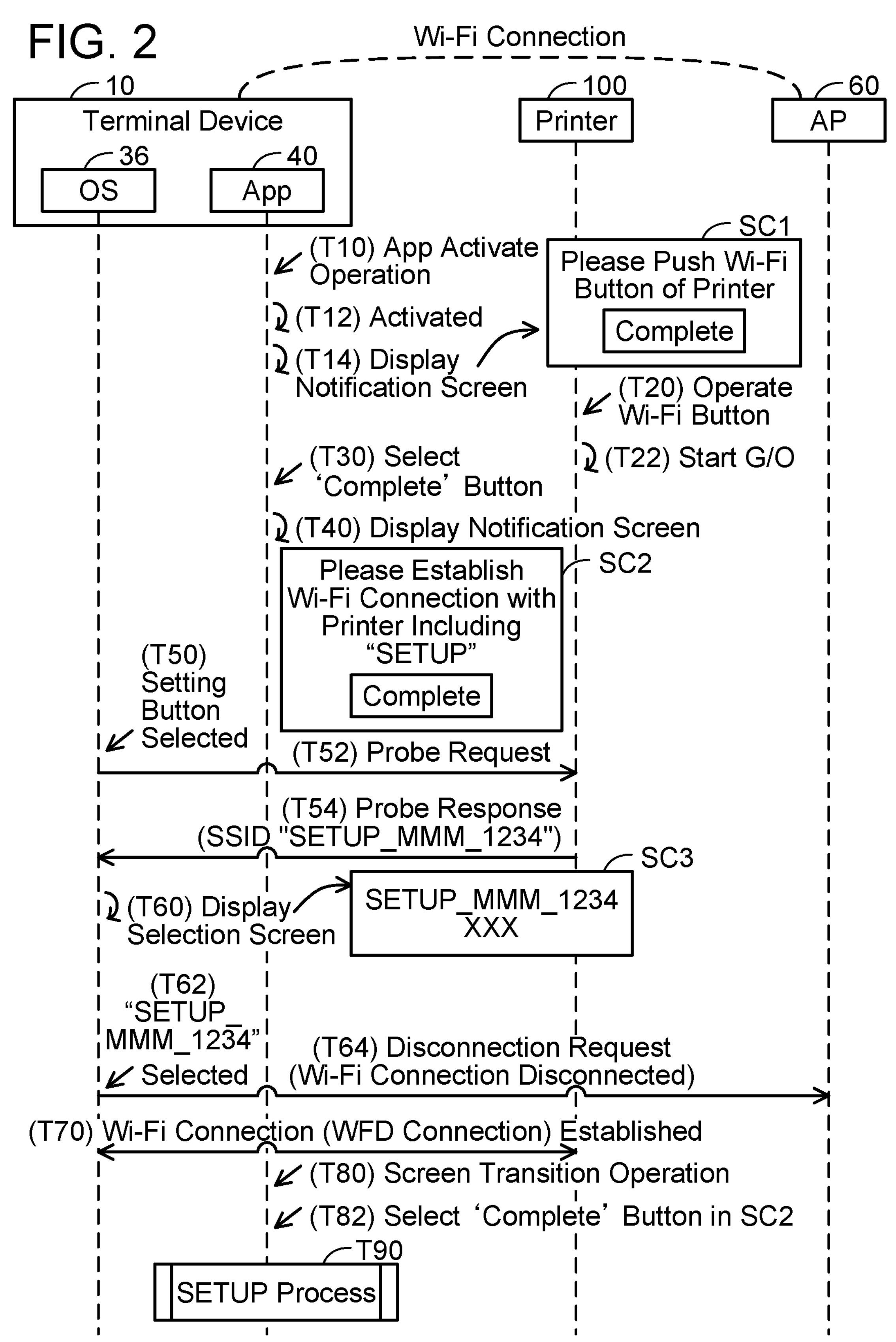
FIG. 2
Wi-Fi Connection
10
Terminal Device
36
OS
40
App
100
Printer
60
AP
SC1
Please Push Wi-Fi Button of Printer
Complete
(T10) App Activate Operation
(T12) Activated
(T14) Display Notification Screen
(T20) Operate Wi-Fi Button
(T22) Start G/O
(T30) Select 'Complete' Button
(T40) Display Notification Screen
SC2
Please Establish Wi-Fi Connection with Printer Including "SETUP"
Complete
(T50) Setting Button Selected
(T52) Probe Request
(T54) Probe Response (SSID "SETUP_MMM_1234")
SC3
SETUP_MMM_1234
XXX
(T60) Display Selection Screen
(T62) "SETUP_MMM_1234" Selected
(T64) Disconnection Request (Wi-Fi Connection Disconnected)
(T70) Wi-Fi Connection (WFD Connection) Established
(T80) Screen Transition Operation
(T82) Select 'Complete' Button in SC2
T90
SETUP Process

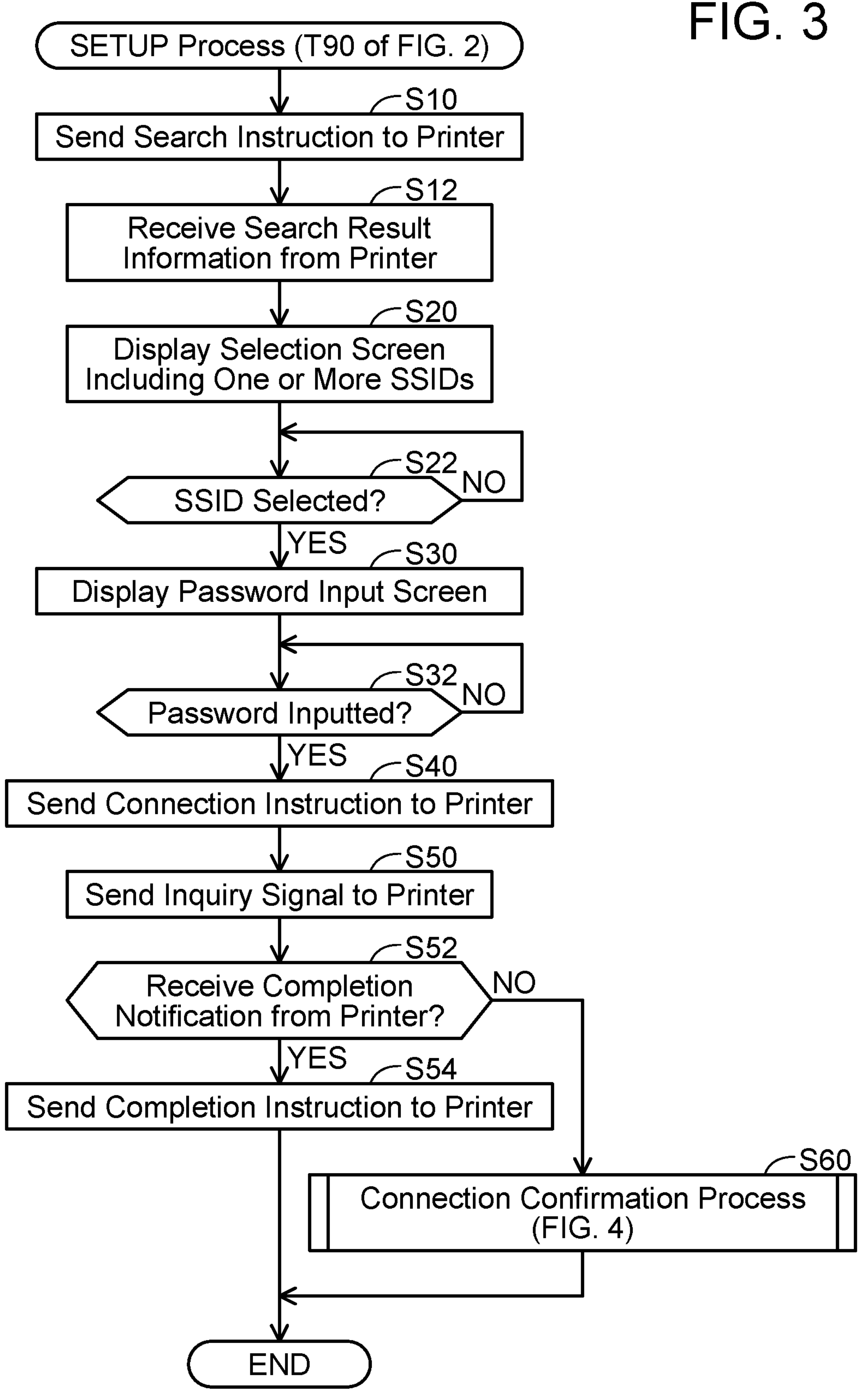
FIG. 3
SETUP Process (T90 of FIG. 2)
S10
Send Search Instruction to Printer
S12
Receive Search Result Information from Printer
S20
Display Selection Screen Including One or More SSIDs
S22
SSID Selected?
NO
YES
S30
Display Password Input Screen
S32
Password Inputted?
NO
YES
S40
Send Connection Instruction to Printer
S50
Send Inquiry Signal to Printer
S52
Receive Completion Notification from Printer?
NO
YES
S54
Send Completion Instruction to Printer
S60
Connection Confirmation Process (FIG. 4)
END

NON-TRANSITORY COMPUTER-READABLE RECORDING MEDIUM STORING COMPUTER READABLE INSTRUCTIONS FOR TERMINAL DEVICE TO CAUSE COMMUNICATION DEVICE TO ESTABLISH WIRELESS CONNECTION WITH ACCESS POINT, TERMINAL DEVICE, AND METHOD FOR CONTROLLING TERMINAL DEVICE

REFERENCE TO RELATED APPLICATION

This application claims priority from Japanese Patent Application No. 2022-125600 filed on Aug. 5, 2022. The entire content of the priority application is incorporated herein by reference.

BACKGROUND ART

Background

A system that includes a terminal device, a printer, and an access point (hereinbelow termed "AP") is known. The terminal device establishes a first Wi-Fi connection with the printer operating as a SoftAP and sends a connection instruction including a SSID and a password of the AP through the first Wi-Fi connection. The printer uses the SSID and the password included in the connection instruction and establishes a second Wi-Fi connection with the AP. When the terminal device receives a completion notification from the printer through the first Wi-Fi connection, it uses the first Wi-Fi connection to send a stop instruction to the printer. As a result of this, the printer stops the SoftAP.

DESCRIPTION

Summary

The description herein provides an art configured to suitably execute necessary communication between a terminal device and a communication device.

A non-transitory computer-readable recording medium storing computer-readable instructions for a terminal device is disclosed herein. The computer-readable instructions, when executed by a processor of the terminal device, may cause the terminal device to: send a connection instruction including connection information to a communication device through a first wireless connection between the terminal device and the communication device, the first wireless connection not being via an access point, the connection instruction being for causing the communication device to execute a connection process, the connection process being a process for establishing a second wireless connection between the communication device and the access point based on the connection information included in the connection instruction; and send a completion instruction to the communication device via the access point through a third wireless connection between the terminal device and the access point, the completion instruction being for causing the communication device to complete the connection process.

According to the above configuration, the terminal device uses the third wireless connection established between the terminal device and the access point to send the completion instruction to the communication device via the access point. Due to this, necessary communication can suitably be executed between the terminal device and the communication device.

The terminal device itself, and a method for controlling the terminal device are also novel and useful. Further, a communication system that comprises the terminal device and the communication device is also novel and useful.

FIG. 1 shows a configuration of a communication system.

FIG. 2 shows a sequence diagram of processes executed by respective devices.

FIG. 3 shows a flowchart of a setup process.

FIRST EMBODIMENT

Figure 4:
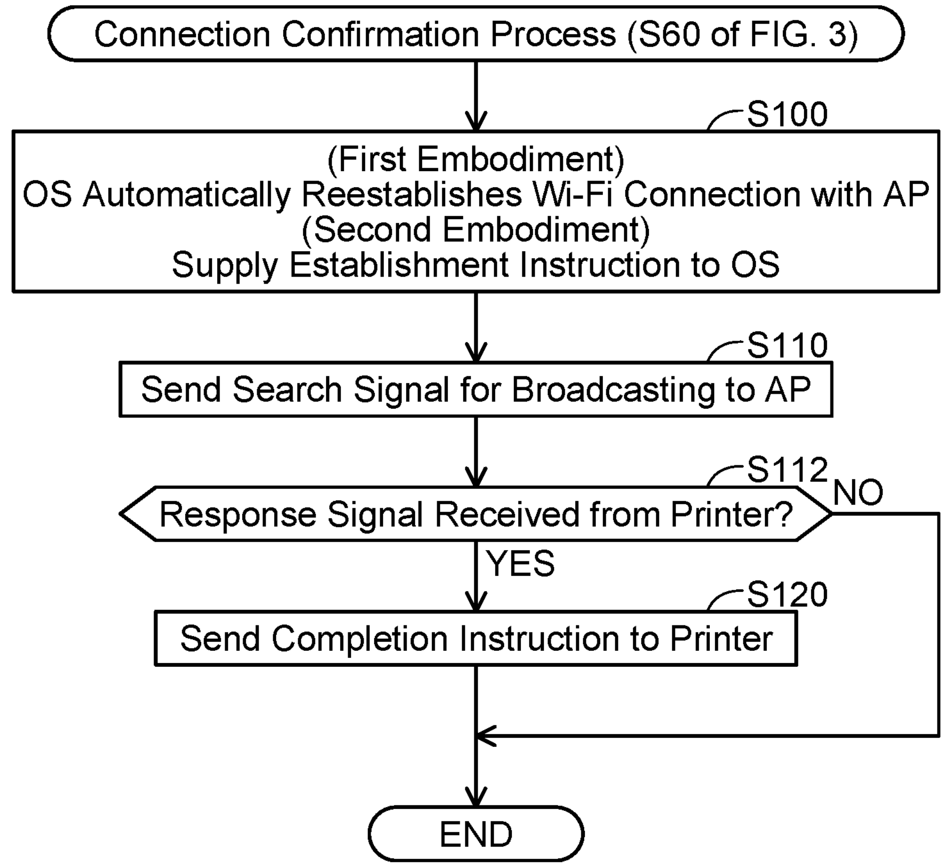
FIG. 4 shows a flowchart of a connection confirmation process.

Configuration of Communication System 2; FIG. 1

As shown in FIG. 1, a communication system 2 comprises a terminal device 10, an access point (hereinbelow termed simply as "AP") 60, and a printer 100. In the present embodiment, a situation where wireless connection conforming to a Wi-Fi standard (hereafter termed "Wi-Fi connection") is established between the printer 100 and the AP 60 by using the terminal device 10 is assumed.

Configuration of Terminal Device 10

The terminal device 10 is a portable terminal device such as a smartphone, PDA, and tablet PC. The terminal device 10 comprises an operation unit 12, a display unit 14, a Wi-Fi interface 20, and a controller 30. The respective units 12 to 30 are connected to a bus line (reference number omitted).

The operation unit 12 comprises a plurality of keys. A user can input various instructions to the terminal device 10 by operating the operation unit 12. The display unit 14 is a display configured to display various types of information. The display unit 14 also functions as a touch panel (i.e., an operation unit) for accepting instructions from the user.

The Wi-Fi interface 20 is a wireless interface for executing Wi-Fi communication conforming to the Wi-Fi standard. The Wi-Fi standards may for example be wireless communication standard for executing wireless communication according to the standard 802.11and its subordinate standards (e.g., 802.11a,11b,11g,11n) by the Institute of Electrical and Electronics Engineers, Inc. (IEEE).

The controller 30 comprises a CPU 32 and a memory 34. The CPU 32 is configured to execute various processes in accordance with programs 36, 40 stored in the memory 34. The memory 34 is constituted of a volatile memory and a non-volatile memory, and stores an OS program 36, a setting application 40, and connection information 50. Hereinbelow, the OS program 36 and the setting application 40 will respectively be termed "OS 36" and "app 40".

The OS 36 is a program for controlling basic operations of the terminal device 10, and may for example be iOS (registered trademark) or Android (registered trademark). The app 40 is installed in the terminal device 10 from a server provided by a vendor of the printer 100 on the Internet. The app 40 is a program for causing Wi-Fi connection to be established between the printer 100 and the AP 60 and causing the printer 100 to execute printing via the AP 60.

The connection information 50 is information related to an AP with which the terminal device 10 has Wi-Fi connection established. The connection information 50 includes a Service Set Identifier (SSID) identifying a wireless network in which the AP operates as a parent station (i.e., SSID that identifies the AP) and a password used for authentication and encryption in the wireless network. In a state shown in FIG. 1, the terminal device 10 has Wi-Fi connection established with the AP 60. Due to this, the connection information 50 includes an SSID "XXX" and a password "AAA" of the AP 60.

Configuration of Printer 100

The printer 100 is a peripheral device (e.g., a peripheral device of the terminal deice 10) configured to execute printing function. The printer 100 comprises an operation unit 112, a display unit 114, a print execution unit 116, a Wi-Fi interface 120, and a controller 130.

The operation unit 112 comprises a plurality of keys. A user can input various instructions to the printer 100 by operating the operation unit 112. The display unit 114 is a display configured to display various types of information. The display unit 114 also functions as a touch panel (i.e., the operation unit) for accepting an instruction from the user. The print execution unit 116 comprises a printing mechanism of an inkjet scheme or laser scheme, for example.

The Wi-Fi interface 120 is same as the Wi-Fi interface 20 of the terminal device 10, and comprises a MAC address "MACp". The Wi-Fi interface 120 supports Wi-Fi Direct (registered trademark, and termed "WFD" hereinbelow). The printer 100 can operate as a Group Owner of the WFD (i.e., a parent station of a wireless network, termed "G/O" hereinbelow).

The controller 130 comprises a CPU 132 and a memory 134. The CPU 132 is configured to execute various processes according to a program 136 stored in the memory 134. The memory 134 is composed of a volatile memory and/or a non-volatile memory, for example. Further, the memory 134 stores G/O information 150 in advance prior to the printer 100 being shipped.

The G/O information 150 is information related to a wireless network in which the printer 100 operates as a G/O. More specifically, the G/O information 150 includes an SSID "SETUP_MMM 1234" for identifying this wireless network. This SSID includes a character string "SETUP" indicating a setup function, a model name "MMM" of the printer 100, and a unique character string "1234" for identifying the printer 100 (e.g., a MAC address or a product ID). The setup function is a function for establishing a Wi-Fi connection between the printer 100 and the AP 60 by using the terminal device 10. In the wireless network in which the printer 100 operates as the G/O, no password is used. Therefore, the G/O information 150 does not include a password.

Processes Executed by Respective Devices 10, 60, 100: FIG. 2

Next, processes executed by the respective devices 10, 60, 100 for realizing the setup function will be described with reference to FIG. 2. In an initial state of FIG. 2, a Wi-Fi connection is established between the terminal device 10 and the AP 60.

Hereinbelow, when explanation is given on the process which the CPU 32 of the terminal device 10 executes according to the OS 36, the explanation will be given with the OS 36 as a subject of action instead of describing the CPU 32 as the subject of action. Similarly, when explanation is given on the process which the CPU 32 executes according to the app 40, the explanation will be given with the app 40 as the subject of action instead of describing the CPU 32 as the subject of action. Further, when explanation is given on the process which the CPU 132 of the printer 100 executes, the explanation will be given with the printer 100 as the subject of action instead of describing the CPU 132 as the subject of action. Further, all the communication executed by the terminal device 10 and the printer 100 is executed via the Wi-Fi interfaces 20, 120. Due to this, in the below description, the description "via the Wi-Fi interface 20 (or 120)" will be omitted.

In T10, an app icon corresponding to the app 40 is selected by the user from among a plurality of icons displayed by the OS 36. In this case, in T12, the OS 36 activates the app 40. As a result, in T14, the app 40 displays a notification screen SC1 on the display unit 14. The notification screen SC1 includes a message prompting the user to operate a Wi-Fi button of the printer 100 and a 'complete' button.

By looking at the notification screen SC1, the user can acknowledge that the Wi-Fi button of the printer 100 should be operated. Then, in T20, the operation on the Wi-Fi button of the printer 100 is performed by the user. In this case, in T22, the printer 100 shifts from a state not operating as the G/O to a state operating as the G/O. That is, the printer 100 starts operating as the parent station of the wireless network identified by the SSID "SETUP_MMM_1234". As above, since the printer 100 operates as the parent station of the wireless network, the printer 100 can suitably establish a Wi-Fi connection with the terminal device 10 in a process to be described later (see T70).

Next, in T30, the 'complete' button in the notification screen SC1 is selected by the user. In this case, in T40, the app 40 displays a notification screen SC2 on the display unit 14. The notification screen SC2 includes a message prompting the user to establish a Wi-Fi connection between the terminal device 10 and the printer 100 and a 'complete' button. Specifically, this message indicates that a Wi-Fi connection with the printer 100 corresponding to the SSID including the character string "SETUP" should be established.

By looking at the notification screen SC2, the user can acknowledge that a Wi-Fi connection should be established between the terminal device 10 and the printer 100. Then, in T50, a setting icon for executing setting related to establishing a Wi-Fi connection is selected by the user from among a plurality of icons displayed by the OS 36. In this case, in T52, the OS 36 sends a Probe request for broadcasting (i.e., a signal of which recipient is not specified).

When the printer 100 receives the Probe request from the terminal device 10 in T52, it sends a Probe response including the SSID "SETUP_MMM_1234" in the G/O information 150 to the terminal device 10 in T54. Although not shown, when the AP 60 receives the Probe request from terminal device 10, it also sends a Probe response including the SSID "XXX" of the AP 60 to the terminal device 10.

When the OS 36 receives the Probe responses from the printer 100 and the AP 60 in T54, it displays in T60 a selection screen SC3 including one or more SSIDs that were included in the one or more received Probe responses on the display unit 14.

Since the user has seen the aforementioned notification screen SC2 (see T40), he/she knows that the SSID including the character string "SETUP" should be selected from the selection screen SC3. Due to this, in T62, the SSID "SETUP_MMM_1234" of the printer 100 included in the selection screen SC3 is selected by the user. In this case, in T64, the OS 36 sends a disconnection request requesting to disconnect the Wi-Fi connection to the AP 60. Due to this, the Wi-Fi connection between the terminal device 10 and the AP 60 is disconnected. Reason why the Wi-Fi connection is disconnected is as follows. The terminal device 10 cannot establish two or more Wi-Fi connections simultaneously. That is, the terminal device 10 cannot establish a Wi-Fi connection with the printer 100 in a state of having a Wi-Fi connection established with the AP 60. Due to this, the terminal device 10 disconnects the Wi-Fi connection with the AP 60 and thereafter establishes the Wi-Fi connection with the printer 100.

Next, in T70, the OS 36 establishes the Wi-Fi connection with the printer 100 based on the SSID of the printer 100 selected in T62. Specifically, the OS 36 sends the Probe request for broadcasting again and receives a Probe response including the SSID "SETUP_MMM_1234" from the printer 100. Due to this, the OS 36 can identify that a sender of this Probe response (i.e., the printer 100) is a target with which the Wi-Fi connection is to be established. Then, the OS 36 executes respective types of communication such as Authentication, Association, and 4-Way Handshake with the printer 100. Due to this, the OS 36 operates as a child station (i.e., as a so-called legacy) and establishes the Wi-Fi connection with the printer 100 (hereinbelow may be termed "WFD connection"). As mentioned above, in the wireless network in which the printer 100 operates as the G/O, no password is used. Due to this, the OS 36 establishes the WFD connection with the printer 100 without requesting the user to input a password. In a modification, a password may be used in the wireless network, in which case the OS 36 establishes the WFD connection with the printer 100 based on the password inputted by the user.

When the WFD connection is established in T70, the OS 36 displays a screen indicating this establishment on the display unit 14 (not shown). The user can acknowledge that the WFD connection has been established by looking at this screen. In this case, in T80, an operation to cause a screen of the app 40 to be displayed as a substitute to the screen of the OS 36 (i.e., an operation on an app icon) is performed by the user. Due to this, the notification screen SC2 displayed in T40 is displayed again, and in T82, the 'complete' button in the notification screen SC2 is selected by the user. In this case, the app 40 executes a setup process in T90 (see FIG. 3).

Setup Process: FIG. 3

Next, the setup process executed in T90 of FIG. 2 is described with reference to FIG. 3. The setup process is a process for causing a Wi-Fi connection to be established between the printer 100 and the AP 60 by sending a connection instruction to the printer 100 using the WFD connection.

In S10, the app 40 uses the WFD connection to send a search instruction to the printer 100. Specifically, when the WFD connection is established in T70 of FIG. 2, the OS 36 receives an IP address of the printer 100 from the printer 100. The app 40 sends the search instruction to the printer 100 by sending the search instruction including this IP address as a recipient address. The feature that this IP address is used as a recipient address applies similarly to S40 and S50 described later. The search instruction is an instruction for causing the printer 100 to search AP(s) existing in surrounding of the printer 100. Due to this, the printer 100 executes a search for AP(s) by sending a Probe request for broadcasting. Then, the printer 100 receives a Probe response including the SSID "XXX" of the AP 60 from the AP 60. When an AP different from the AP 60 exists in the surrounding of the printer 100, the printer 100 receives a Probe response from this different AP as well.

In S12, the app 40 uses the WFD connection to receive search result information from the printer 100. The search result information includes one or more SSIDs of one or more APs found by the aforementioned search. The search result information includes at least the SSID "XXX" of the AP 60.

In S20, the app 40 displays a selection screen including the one or more SSIDs in the search result information on the display unit 14.

In S22, the app 40 monitors one SSID being selected from the selection screen displayed in S20. The app 40 determines YES to S22 when the SSID (which is the SSID "XXX" of the AP 60 in the present embodiment) is selected, and proceeds to S30.

In S30, the app 40 displays a password input screen on the display unit 14. The password input screen is a screen for inputting a password of the AP 60.

In S32, the app 40 monitors a password being inputted to the password input screen. Further, the app 40 determines YES to S32 when a password (which is the password "AAA" of the AP 60 in the present embodiment) is inputted, and proceeds to S40.

In S40, the app 40 uses the WFD connection to send a connection instruction to the printer 100. The connection instruction is an instruction for causing a Wi-Fi connection to be established between the printer 100 and the AP 60, and includes connection information. The connection information includes the SSID "XXX" selected in S22 and the password "AAA" inputted in S32.

When the connection instruction is sent to the printer 100 in S40, the printer 100 uses the SSID "XXX" and the password "AAA" included in the connection instruction and executes a connection process for establishing a Wi-Fi connection with the AP 60. Specifically, the printer 100 sends a Probe request and receives a Probe response including the SSID "XXX" from the AP 60. Due to this, the printer 100 can acknowledge that the AP 60, which is the sender of the Probe response, is a target with which the Wi-Fi connection is to be established. Next, the printer 100 executes respective types of communication such as Authentication, Association, and 4-Way Handshake with the AP 60. In the course of executing the communication as above, information obtained based on the password "XXX" is sent from the printer 100 to the AP 60, and authentication is executed by the AP 60. If this authentication is successful, the Wi-Fi connection is established between the printer 100 and the AP 60.

In S50, the app 40 uses the WFD connection to attempt sending an inquiry signal to the printer 100. The inquiry signal is a signal for inquiring whether a Wi-Fi connection has been established between the printer 100 and the AP 60 as the result of the connection process. When the Wi-Fi connection is established between the printer 100 and the AP 60, there is a possibility that the WFD connection between the terminal device 10 and the printer 100 is disconnected by the printer 100. Reason therefor is as follows. The printer 100 normally comprises only one Wi-Fi interface 120 (i.e., one antenna). Due to this, the printer 100 executes a process for maintaining the WFD connection with the terminal device 10 and a process for maintaining the Wi-Fi connection with the AP 60 in a time-divisional manner. Due to this, processing load and communication load on the printer 100 become large, as a result of which the printer 100 may disconnect the WFD connection with the terminal device 10. When the WFD connection is disconnected as above, the app 40 cannot send the inquiry signal to the printer 100 through the WFD connection in S50.

In S52, the app 40 determines whether it receives a completion notification, which is a response to the inquiry signal, from the printer 100 using the WFD connection. The completion notification is a notification indicating that a Wi-Fi connection has been established between the printer 100 and the AP 60. When the app 40 receives the completion notification from the printer 100, that is, when the WFD connection is maintained by the printer 100, it determines YES to S52 and proceeds to S54. When the completion notification is not received from the printer 100 even though a predetermined time has elapsed since the transmission of the inquiry signal, that is, when the WFD connection is disconnected by the printer 100, the app 40 determines NO to S52 and proceeds to S60. As above, the app 40 can determine whether the WFD connection is maintained or disconnected by the printer 100 by determining whether the inquiry signal has been sent and the completion notification has thus been received.

In S54, the app 40 uses the WFD connection to send a completion instruction to the printer 100. The completion instruction is an instruction for causing the printer 100 to complete the connection process. Specifically, the completion instruction is an instruction for causing the printer 100 to stop operating as the WFD G/O. Due to this, the printer 100 shifts from the state operating as the G/O to the state not operating as the G/O. Due to this, the WFD connection between the terminal device 10 and the printer 100 is disconnected. Since the WFD connection is disconnected, processing load on each of the terminal device 10 and the printer 100 is reduced.

The completion instruction is an instruction to further cause the printer 100 to register the connection information included in the connection instruction sent in S40 (i.e., the SSID "XXX" and the password "AAA"). Due to this, the printer 100 stores (i.e., registers) the connection information in a predetermined region in a nonvolatile storage region of the memory 34. Here, this predetermined region is a region for the printer 100 to store connection information of an AP with which a Wi-Fi connection is to be established. Since the connection information of the AP 60 is stored in this predetermined region, the printer 100 can re-establish the Wi-Fi connection with the AP 60 using the connection information in the predetermined region even when its power is turned off and turned back on again later, for example.

When the WFD connection with the printer 100 is disconnected in S54, the OS 36 automatically re-establishes the Wi-Fi connection with the AP 60 without obtaining an instruction from the app 40. That is, the OS 36 automatically re-establishes the Wi-Fi connection that was once established before. Reason therefor may be as follows. For example, after the WFD connection with the printer 100 is disconnected, the OS 36 attempts to re-establish this WFD connection once or more, however, when those attempts end in failure, it establishes another Wi-Fi connection that was once established before (i.e., the Wi-Fi connection with the AP 60). Alternatively, the OS 36 monitors a radio wave intensity with each AP existing in its surrounding (i.e., including the printer 100 being the G/O), and establishes the Wi-Fi connection with the AP 60 having the largest radio wave intensity. Due to this, both the terminal device 10 and the printer 100 come to participate in the same wireless network formed by the AP 60. As such, the terminal device 10 (i.e., the app 40) can send print data representing a print target image to the printer 100 via the AP 60 and cause the printer 100 to print this image. When S54 is completed, the process of FIG. 3 is terminated.

In S60, the app 40 executes a connection confirmation process (see FIG. 4). The connection confirmation process is a process for confirming with the printer 100 via the AP 60 whether a Wi-Fi connection has been established between the printer 100 and the AP as the result of the connection process. As above, in determining NO to S52, that is, when it is determined that the WFD connection has been disconnected by the printer 100, the app 40 executes the connection confirmation process of S60 without displaying an error screen indicating that the connection process of the printer 100 has not been completed on the display unit 14. Since the connection confirmation process can be executed via the AP 60, it is still yet not an appropriate timing to display the error screen. When S60 is completed, the process of FIG. 3 is terminated. In a modification, the app 40 may display the error screen on the display unit 14 when it determines NO to S52.

Connection Confirmation Process: FIG. 4

Next, the connection confirmation process executed in S60 of FIG. 3 will be described with reference to FIG. 4. As explained in S54 of FIG. 3, when the WFD connection with the printer 100 is disconnected, the OS 36 automatically re-establishes the Wi-Fi connection with the AP 60 without obtaining any instruction from the app 40.

In S110, the app 40 uses the Wi-Fi connection with the AP 60 to send a search signal for broadcasting to the AP 60. Due to this, the AP 60 transfers the search signal to the respective devices connected to the AP 60 (i.e., devices including the printer 100).

The app 40 receives response signals from the above-mentioned respective devices via the AP 60. Each response signal includes a MAC address of its sender device. Then, in S112, the app 40 determines whether a response signal from the printer 100 was received. Specifically, the app 40 may for example store a MAC address "MACp" of the printer 100 included in a signal which it receives from the printer 100 such as in T70 of FIG. 2 or S12 of FIG. 3. Then, the app 40 determines that the response signal from the printer 100 was received (YES to S112) when a response signal including the MAC address "MACp" is received, and proceeds to S120. The response signal having been received from the printer 100 means that the Wi-Fi connection between the printer 100 and the AP 60 has been established. As such, by determining YES to S112, the app 40 can acknowledge that the Wi-Fi connection between the printer 100 and the AP 60 has been established.

On the other hand, when the response signal including the MAC address "MACp" is not received, the app 40 determines that the response signal from the printer 100 was not received (NO to S112), skips S120 and terminates the process of FIG. 4. In this case, although not shown, the app 40 may cause an error screen indicating that the connection process for the printer 100 is not complete to be displayed. Due to this, the app 40 can notify the user that the connection process for the printer 100 is not complete, that is, the operation of the printer 100 as the G/O has not been stopped, and that the connection information of the AP 60 is not registered in the printer 100.

In S120, the app 40 uses the Wi-Fi connection with the AP 60 to send a completion instruction to the printer 100. Specifically, the response signal received in S112 from the printer 100 includes the IP address of the printer 100. The app 40 sends the completion instruction to the printer 100 by sending the completion instruction having this IP address as a recipient address to the AP 60. The completion instruction sent hereof is same as the completion instruction in S54 of FIG. 3 except that its recipient address may be different. Thus, the app 40 can stop the WFD G/O operation of the printer 100 and can register the connection information (i.e., the SSID "XXX" and the password "AAA") in the printer 100. When the process of S120 is completed, the process of FIG. 4 is terminated.

Figure 5:
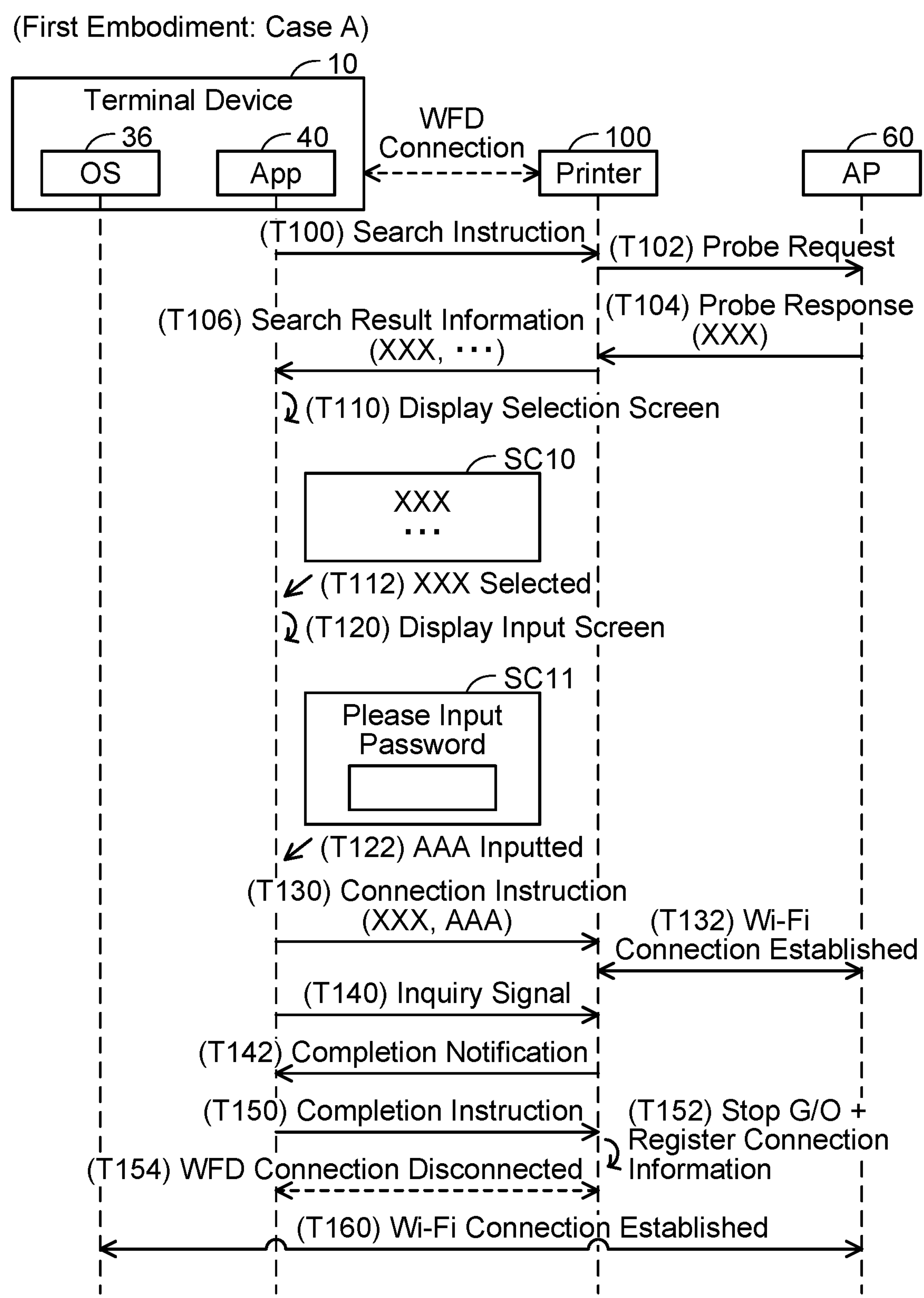
FIG. 5 shows a sequence diagram of Case A.

Case A: FIG. 5

Figure 6:
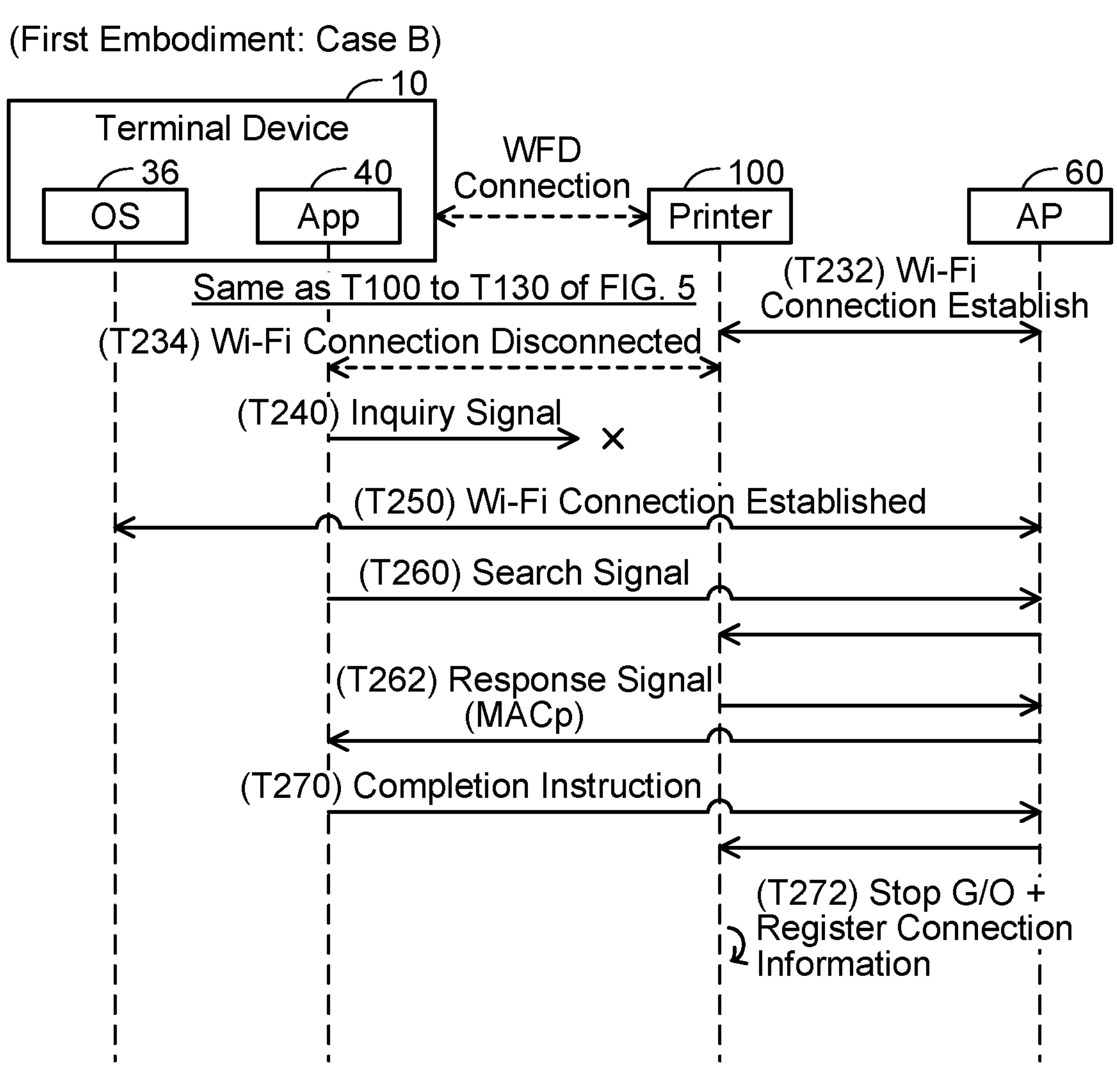
FIG. 6 shows a sequence diagram of Case B

Next, specific cases realized by the processes of FIGS. 3 and 4 will be described with reference to FIGS. 5 and 6. Firstly, Case A will be described with reference to FIG. 5. Case A is a case in which the WFD connection between the terminal device 10 and the printer 100 is maintained by the printer 100.

In T100, the app 40 uses the WFD connection to send the search instruction to the printer 100 (S10 of FIG. 3). In this case, the printer 100 sends the Probe request in T102, and receives the Probe response from the AP 60 in T104. Next, in T106, the printer 100 uses the WFD connection to send the search result information including the SSID "XXX" of the AP 60 to the terminal device 10.

In T106, when the app 40 receives the search result information from the printer 100 (S12), it displays a selection screen SC10 including the SSID "XXX" in the search result information in T110 (S20). In T112, when the SSID "XXX" in the selection screen SC10 is selected by the user (YES to S22), the app 40 displays a password input screen SC11 in T120 (S30). In T122, when the password "AAA" is inputted to the password input screen SC11 by the user (YES to S32), the app 40 sends the connection instruction including the connection information (i.e., the SSID "XXX" and the password "AAA") to the printer 100 in T130 (S40).

When the connection instruction is received from the terminal device 10 in T130, the printer 100 establishes the Wi-Fi connection with the AP 60 in T132 based on the connection information included in the connection instruction. In the present case, the printer 100 maintains the WFD connection with the terminal device 10 without communication becoming unstable after the Wi-Fi connection with the AP 60 has been established.

In T140, the app 40 uses the WFD connection to send the inquiry signal to the printer 100 (S50), and in T142, it uses the WFD connection to receive the completion notification from the printer 100 (YES to S52). In this case, in T150, the app 40 uses the WFD connection to send the completion instruction to the printer 100 (S54).

When the printer 100 receives the completion instruction from the terminal device 10 in T150, it stops the operation as the G/O and registers the connection information in T152. Due to this, in T154, the WFD connection is disconnected.

When the WFD connection is disconnected in T154, the OS 36 automatically re-establishes the Wi-Fi connection with the AP 60 in T160. Due to this, the terminal device 10 and the printer 100 are connected to the same AP 60. Due to this, the app 40 can send the image data representing the print target image to the printer 100 via the AP 60 and cause the printer 100 to execute printing of this image (not shown).

Case B: FIG. 6

Next, Case B will be described with reference to FIG. 6. Case B is a case in which the WFD connection between the terminal device 10 and the printer 100 is disconnected by the printer 100. Processes similar to T100 to T130 of FIG. 5 are executed. Due to this, In T232, the printer 100 establishes the Wi-Fi connection with the AP 60. In the present case, the printer 100 enters a state in which the communication is unstable after having established the Wi-Fi connection with the AP 60, and disconnects the WFD connection with the terminal device 10 in T234.

In T240, the app 40 uses the WFD connection to attempt sending the inquiry signal to the printer 100 (S50 of FIG. 3), however, it does not receive the completion notification from the printer 100 (NO to S52). When the WFD connection is disconnected in T234, the OS 36 automatically re-establishes the Wi-Fi connection with the AP 60 in T250.

In T260, the app 40 uses the Wi-Fi connection with the AP 60 to send the search signal for broadcasting to the AP 60 (S110 of FIG. 4). As a result, the search signal is transferred from the AP 60 to the printer 100. Then, in T262, the app 40 receives the response signal including the MAC address "MACp" from the printer 100 via the AP 60 (YES to S112). In this case, in T270, the app 40 uses the Wi-Fi connection with the AP 60 to send the completion instruction to the printer 100 (S120).

When the completion instruction is received from the terminal device 10 in T270, the printer 100 stops operating as the G/O and registers the connection information in T272.

In the present case as well, the terminal device 10 and the printer 100 are connected to the same AP 60. Due to this, the app 40 can send the image data representing the print target image to the printer 100 via the AP 60 and cause the printer 100 to execute printing of this image (not shown).

Effects of Embodiment

According to the present embodiment, when the WFD connection is disconnected by the printer 100 (T234 of FIG. 6), the terminal device 10 uses the Wi-Fi connection between the terminal device 10 and the AP 6 to send the completion instruction to the printer 100 via the AP 60 (T270). Due to this, necessary communication between the terminal device 10 and the printer 100 (i.e., communicating the completion instruction) can suitably be executed.

Further, when the WFD connection is disconnected by the printer 100 (T234 of FIG. 6), the terminal device 10 uses the Wi-Fi connection between the terminal device 10 and the AP 60 to execute the connection confirmation process (T260, T262). Due to this, necessary communication between the terminal device 10 and the printer 100 (i.e., communication for the connection confirmation) can suitably be executed.

Corresponding Relationship

The printer 100 is an example of "communication device". The Wi-Fi connection (i.e., the WFD connection) in T70 of FIG. 2, the Wi-Fi connection in T132 of FIG. 5, and the Wi-Fi connection in T250 of FIG. 6 are respectively an example of "first wireless connection", "second wireless connection", and "third wireless connection". The processes of S50 and 52 of FIG. 3 are an example of "first confirmation process" and the processes of S110 and S112 of FIG. 4 are an example of "second confirmation process". The completion notification in S52 of FIG. 3 and the response signal from the printer 100 in S112 of FIG. 4 are respectively an example of "first response signal" and "second response signal". The instruction to select an SSID in T62 of FIG. 2 is an example of "instruction for establishing the first wireless connection".

S40 of FIG. 3 is an example of "send a connection instruction including connection information to the communication device". S54 of FIG. 3 is an example of "send a completion instruction to the communication device". S120 of FIG. 4 is an example of "send the completion instruction to the communication device". S50 and S52 of FIG. 3 are an example of "execute a first confirmation process for confirming whether the connection process has succeeded or not". S110 and S112 of FIG. 4 are an example of "execute a second confirmation process for confirming whether the connection process has succeeded or not". S50 and S52 of FIG. 3 are respectively an example of "attempt to send an inquiry signal to the communication device through the first wireless connection" and "determine that the first wireless connection has been disconnected by the communication device".

Second Embodiment

Next, a second embodiment will be described. In the first embodiment, the OS 36 automatically re-establishes the Wi-Fi connection with the AP 60 when the WFD connection with the printer 100 is disconnected. Contrary to this, in the present embodiment, the OS 36 does not automatically re-establish the Wi-Fi connection with the AP 60 when the WFD connection is disconnected. Whether to operate as such or as in the first embodiment is dependent on the types of the OS 36.

When the WFD connection with the printer 100 is disconnected, the app 40 supplies an establishment instruction including the SSID "XXX" of the AP 60 to the OS 36 in S100 of FIG. 4. The establishment instruction is a command instructing to establish the Wi-Fi connection with the AP 60 identified by the SSID "XXX". When the establishment instruction is obtained from the app 40, the OS 36 re-establishes the Wi-Fi connection with the AP 60. Other processes are similar to those of the first embodiment.

Figure 7:
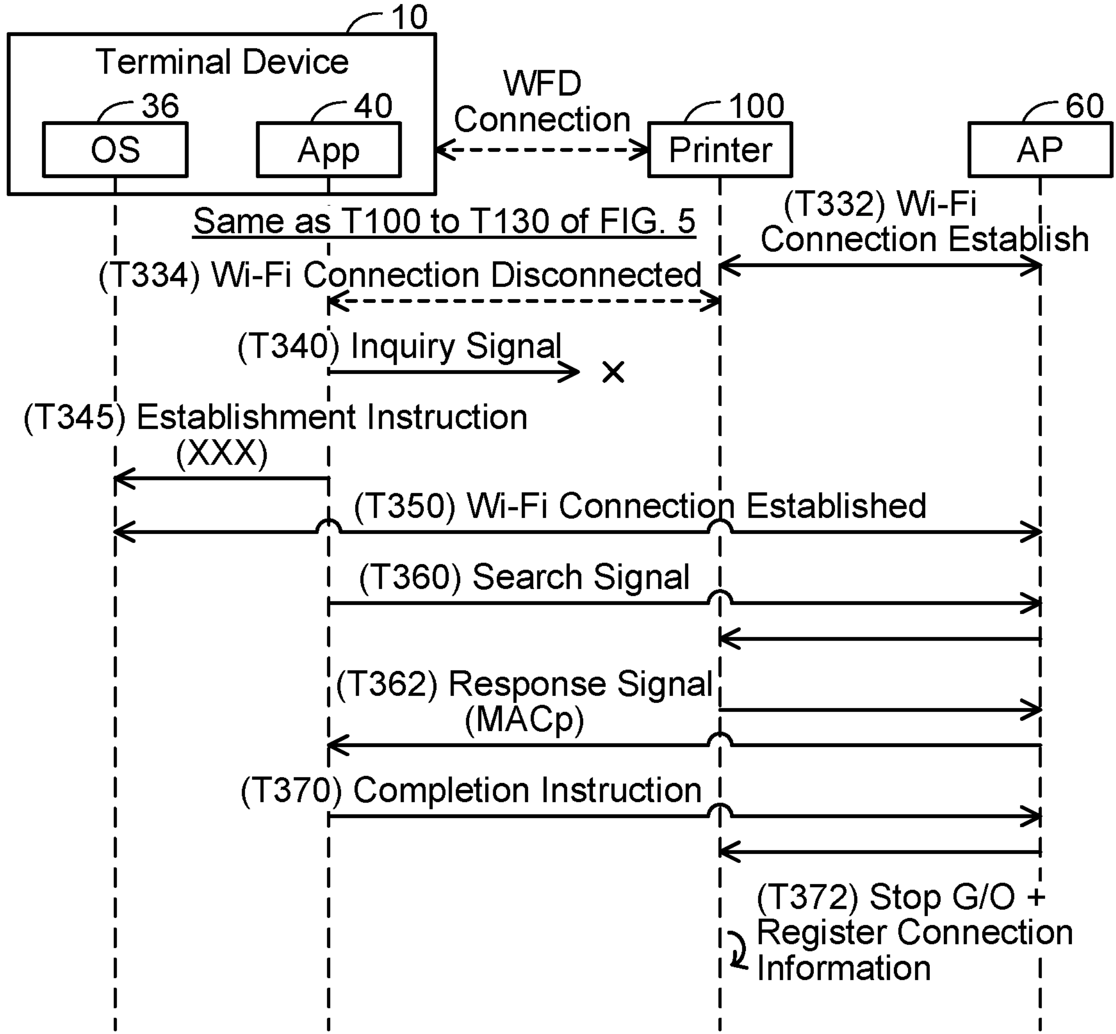
FIG. 7 shows a sequence diagram of a second embodiment.

Specific Case: FIG. 7

A specific case realized in the present embodiment will be described with reference to FIG. 7. The case of FIG. 7 is a case in which the WFD connection between the terminal device 10 and the printer 100 is disconnected by the printer 100. Processes similar to T100 to T130 of FIG. 5 are executed. Due to this, in T332, the printer 100 establishes the Wi-Fi connection with the AP 60. In the present case, the printer 100 enters a state in which the communication is unstable after having established the Wi-Fi connection with the AP 60, and disconnects the WFD connection with the terminal device 10 in T334.

In T340, the app 40 uses the WFD connection to attempt sending the inquiry signal to the printer 100 (S50 of FIG. 3), however, it does not receive the completion notification from the printer 100 (NO to S52). In this case, in T345, the app 40 supplies the establishment instruction including the SSID "XXX" to the OS 36 (S100 of FIG. 4). As a result, the OS 36 re-establishes the Wi-Fi connection with the AP 60 in T350. Processes of T360 to T372 that take place thereafter are similar to the processes of T260 to T272 of FIG. 6.

Effects of Second Embodiment

According to the present embodiment, the app 40 supplies the establishment instruction to the OS 36 (T345) when the WFD connection with the printer 100 is disconnected. As above, the app 40 can suitably cause the OS 36 to re-establish the Wi-Fi connection with the AP 60 by supplying the establishment instruction to the OS 36. In the present embodiment, S100 of FIG. 4 is an example of "supply an establishment instruction to instruct for establishing the third wireless connection to an operating system (OS) program of the terminal device".

Specific examples of the present disclosure have been described in detail, however, these are mere exemplary indications and thus do not limit the scope of the claims. The art described in the claims include modifications and variations of the specific examples presented above. Some of modifications will be listed as below.

(Modification 1) When the WFD connection is to be maintained after having established the Wi-Fi connection with the AP 60, the printer 100 may use the WFD connection to send the completion notification to the terminal device 10 without having have to receive the inquiry signal from the terminal device 10. When this configuration is employed, the app 40 does not have to use the WFD connection to send the inquiry signal to the printer 100 in S50 of FIG. 3. That is, the process of S50 may be omitted. In this case, the app 40 determines that the WFD connection is maintained when it receives the completion notification from the printer 100 before the predetermined time elapses since the connection instruction was sent to the printer 100 in S40, and determines that the WFD connection has been disconnected when it does not receive the completion notification from the printer 100 even when the predetermined time as aforementioned elapses. In this modification, "execute a first confirmation process for confirming whether the connection process has succeeded or not" and "attempt to send an inquiry signal to the communication device through the first wireless connection" may be omitted.

(Modification 2) The app 40 may send a completion instruction for broadcasting to the AP 60 in S120 without executing S110 and S112 of FIG. 4. In this configuration as well, the app 40 can send the completion instruction to the printer 100 via the AP 60. In this modification, "execute a second confirmation process for confirming whether the connection process has succeeded or not" may be omitted.

(Modification 3) When the printer 100 is to use the WFD connection to send the completion notification to the terminal device 10, the printer 100 may stop operating as the G/O without receiving the instruction from the terminal device 10. When this configuration is employed, the app 40 does not have to send the completion instruction for stopping the operation as the G/O to the printer 100. In generalized terms, "completion instruction" may not be an instruction for causing the communication device to stop operating as the parent station.

(Modification 4) When the printer 100 uses the WFD connection to send the completion notification to the terminal device 10, it may register the connection information even without receiving the instruction from the terminal device 10. When this configuration is employed, the app 40 does not have to send the completion instruction for registering the connection information to the printer 100. In generalized terms, "completion instruction" may not be an instruction for causing the communication device to register the connection information.

(Modification 5) When the terminal device 10 is capable of simultaneously establishing multiple Wi-Fi connections, the OS 36 does not have to disconnect the Wi-Fi connection with the AP 60 in T64 of FIG. 2. In this case, T160 of FIG. 5, T250 of FIG. 6, and T345 of FIG. 7 (i.e., S100 of FIG. 4) and T350 may be omitted. In generalized terms, "OS program" does not have to disconnect the third wireless connection when the instruction for establishing the first wireless connection is obtained. Further, in "send the completion instruction to the communication device using a third wireless connection via the access point", when the first wireless connection is disconnected by the communication device, the third wireless connection that was maintained from before this disconnection of the first wireless connection may be used to send the completion instruction to the communication device.

(Modification 6) As discussed in Modifications 3 and 4 as above, the printer 100 may stop operating as the G/O and register the connection information even without receiving the instruction from the terminal device 10 when it uses the WFD connection to send the completion notification to the terminal device 10. When this configuration is employed, the app 40 does not have to send the completion instruction to the printer 100. That is, the process of S54 of FIG. 3 and the process of S120 of FIG. 4 may be omitted. The technique of the present modification is for suitably executing the confirmation process for confirming whether the connection process was successful in S50 and S52 of FIG. 3 and S110 and S112 of FIG. 4. That is, sending the completion instruction to the communication device is not essential in the technique of the present modification.

(Modification 7) In the above embodiments, the WFD connection in which the printer 100 is the G/O and the terminal device 10 is the child station is established in T70 of FIG. 2. Instead of this, a WFD connection in which the terminal device 10 is the G/O and the printer 100 is the child station may be established. Further, in another modification, the printer 100 may operate as a so-called SoftAP instead of operating as the WFD G/O and may establish a Wi-Fi connection with the terminal device 10 as such. Further, in yet another modification, a Wi-Fi connection in which the terminal device 10 is the SoftAP and the printer 100 is the child station may be established. In a different modification, a wireless connection conforming to Bluetooth (registered trademark) may be established between the terminal device 10 and the printer 100 instead of the Wi-Fi connection. That is, the connection instruction may be sent from the terminal device 10 to the printer 100 by the Bluetooth wireless connection conforming to Bluetooth. In this modification as well, the processing load on the printer 100 will become large when it establishes the Wi-Fi connection with the AP 60, thus the printer 100 may inadvertently disconnect the Bluetooth wireless connection. In generalized terms, "first wireless connection" simply needs to be a wireless connection not involving (i.e., not via) an access point.

(Modification 8) "Communication device" may not be the printer 100, and may for example be another device such as a scanner, multiple function peripheral, a mobile terminal, a PC, and a server.

(Modification 9) In the above embodiments, the respective processes of FIGS. 2 to 7 are realized by software (such as the app 40), however, at least one of these processes may be realized by hardware such as a logic circuit.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A non-transitory computer-readable recording medium storing computer-readable instructions for a terminal device, wherein the computer-readable instructions, when executed by a processor of the terminal device, cause the terminal device to:

send a connection instruction including connection information to a communication device through a first wireless connection between the terminal device and the communication device, the first wireless connection not being via an access point, the connection instruction being for causing the communication device to execute a connection process, the connection process being a process for establishing a second wireless connection between the communication device and the access point based on the connection information included in the connection instruction; and send a completion instruction via the access point through a third wireless connection between the terminal device and the access point, the completion instruction being for causing the communication device to complete the connection process, wherein the first wireless connection is a wireless connection where the communication device operates as a parent station, and the completion instruction is for causing the communication device to stop operating as the parent station.

2. The non-transitory computer-readable recording medium as in claim 1, wherein the computer-readable instructions, when executed by the processor, further cause the terminal device to:

in a case where the first wireless connection is maintained by the communication device after the connection instruction has been sent to the communication device, send the completion instruction to the communication device through the first wireless connection; and the computer-readable instructions, when executed by the processor, cause the terminal device to:

in a case where the first wireless connection is disconnected by the communication device after the connection instruction has been sent to the communication device, send the completion instruction to the communication device via the access point through the third wireless connection between the terminal device and the access point.

3. The non-transitory computer-readable recording medium as in claim 1, wherein the computer-readable instructions, when executed by the processor, further cause the terminal device to:

in a case where the first wireless connection is maintained by the communication device after the connection instruction has been sent to the communication device, execute a first confirmation process for confirming whether the connection process has succeeded or not, wherein the first confirmation process includes sending an inquiry signal to the communication device through the first wireless connection and receiving a first response signal in response to the inquiry signal from the communication device through the first wireless connection; and in a case where the first wireless connection is disconnected by the communication device after the connection instruction has been sent to the communication device, execute a second confirmation process for confirming whether the connection process has succeeded or not, wherein the second confirmation process includes sending a search signal for broadcasting to the access point through the third wireless connection and receiving a second response signal in response to the search signal via the access point from the communication device through the third wireless connection.

4. The non-transitory computer-readable recording medium as in claim 1, wherein in a case where the first wireless connection is disconnected by the communication device after the connection instruction has been sent to the communication device, an establishment instruction for instructing to establish the third wireless connection is not supplied to an operating system (OS) program of the terminal device, and in the case where the first wireless connection is disconnected by the communication device after the connection instruction has been sent to the communication device, the third wireless connection is automatically established by the OS program.

5. The non-transitory computer-readable recording medium as in claim 1, wherein the computer-readable instructions, when executed by the processor, further cause the terminal device to:

in a case where the first wireless connection is disconnected by the communication device after the connection instruction has been sent to the communication device, supply an establishment instruction for instructing to establish the third wireless connection to an operating system (OS) program of the terminal device.

6. The non-transitory computer-readable recording medium as in claim 1, wherein the computer-readable instructions, when executed by the processor, further cause the terminal device to:

attempt to send an inquiry signal to the communication device through the first wireless connection after the connection instruction has been sent to the communication device;

in a case where a first response signal in response to the inquiry signal is received from the communication device through the first wireless connection, determine that the first wireless connection is maintained by the communication device; and in a case where the first response signal is not received from the communication device through the first wireless connection, determine that the first wireless connection has been disconnected by the communication device.

7. The non-transitory computer-readable recording medium as in claim 6, wherein in a case where it is determined that the first wireless connection has been disconnected by the communication device, an error screen is not displayed on a display unit of the terminal device.

8. The non-transitory computer-readable recording medium as in claim 1, wherein an operating system (OS) program of the terminal device is configured to:

in a case where an instruction for establishing the first wireless connection is obtained in a state where the third wireless connection is established between the terminal device and the access point, disconnect the third wireless connection; and in a case where the third wireless connection is disconnected, establish the first wireless connection between the terminal device and the communication device, and the computer-readable instructions, when executed by the processor, cause the terminal device to:

in the case where the first wireless connection is disconnected by the communication device after the connection instruction has been sent to the communication device, send the completion instruction to the communication device via the access point through the third wireless connection which is reestablished.

9. A method for controlling a terminal device, the method comprising:

sending a connection instruction including connection information to a communication device through a first wireless connection between the terminal device and the communication device, the first wireless connection not being via an access point, the connection instruction being for causing the communication device to execute a connection process, the connection process being a process for establishing a second wireless connection between the communication device and the access point based on the connection information included in the connection instruction; and sending a completion instruction to the communication device via the access point through a third wireless connection between the terminal device and the access point, the completion instruction being for causing the communication device to complete the connection process, wherein, the completion instruction is for registering the connection information in the communication device.

10. The method as in claim 9, the method further comprising:

in a case where the first wireless connection is maintained by the communication device after the connection instruction has been sent to the communication device, sending the completion instruction to the communication device through the first wireless connection; and the method comprising:

in a case where the first wireless connection is disconnected by the communication device after the connection instruction has been sent to the communication device, sending the completion instruction to the communication device via the access point through the third wireless connection between the terminal device and the access point.

11. The method as in claim 9, the method further comprising:

in a case where the first wireless connection is maintained by the communication device after the connection instruction has been sent to the communication device, executing a first confirmation process for confirming whether the connection process has succeeded or not, wherein the first confirmation process includes sending an inquiry signal to the communication device through the first wireless connection and receiving a first response signal in response to the inquiry signal from the communication device through the first wireless connection; and in a case where the first wireless connection is disconnected by the communication device after the connection instruction has been sent to the communication device, executing a second confirmation process for confirming whether the connection process has succeeded or not, wherein the second confirmation process includes sending a search signal for broadcasting to the access point through the third wireless connection and receiving a second response signal in response to the search signal via the access point from the communication device through the third wireless connection.

12. The method as in claim 9, wherein in a case where the first wireless connection is disconnected by the communication device after the connection instruction has been sent to the communication device, an establishment instruction for instructing to establish the third wireless connection is not supplied to an operating system (OS) program of the terminal device, and in the case where the first wireless connection is disconnected by the communication device after the connection instruction has been sent to the communication device, the third wireless connection is automatically established by the OS program.

13. The method as in claim 9, the method further comprising:

in a case where the first wireless connection is disconnected by the communication device after the connection instruction has been sent to the communication device, supplying an establishment instruction for instructing to establish the third wireless connection to an operating system (OS) program of the terminal device.

14. The method as in claim 9, the method further comprising:

attempting to send an inquiry signal to the communication device through the first wireless connection after the connection instruction has been sent to the communication device;

in a case where a first response signal in response to the inquiry signal is received from the communication device through the first wireless connection, determining that the first wireless connection is maintained by the communication device; and in a case where the first response signal is not received from the communication device through the first wireless connection, determining that the first wireless connection has been disconnected by the communication device.

15. The method as in claim 14, wherein in a case where it is determined that the first wireless connection has been disconnected by the communication device, an error screen is not displayed on a display unit of the terminal device.

16. The method as in claim 9, wherein the first wireless connection is a wireless connection where the communication device operates as a parent station, and the completion instruction is for causing the communication device to stop operating as the parent station.

17. A non-transitory computer-readable recording medium storing computer-readable instructions for a terminal device, wherein the computer-readable instructions, when executed by a processor of the terminal device, cause the terminal device to:

send a connection instruction including connection information to a communication device through a first wireless connection between the terminal device and the communication device, the first wireless connection not being via an access point, the connection instruction being for causing the communication device to execute a connection process, the connection process being a process for establishing a second wireless connection between the communication device and the access point based on the connection information included in the connection instruction; and send a completion instruction via the access point through a third wireless connection between the terminal device and the access point, the completion instruction being for causing the communication device to complete the connection process, wherein the completion instruction is for registering the connection information in the communication device.

* * * * *